United States Patent
Horowitz

(10) Patent No.: US 9,145,154 B1
(45) Date of Patent: Sep. 29, 2015

(54) FOLDING WAGON

(71) Applicant: Brian Horowitz, Foothill Ranch, CA (US)

(72) Inventor: Brian Horowitz, Foothill Ranch, CA (US)

(*) Notice: Subject to any disclaimer, the term of this patent is extended or adjusted under 35 U.S.C. 154(b) by 0 days.

(21) Appl. No.: 14/491,155

(22) Filed: Sep. 19, 2014

(51) Int. Cl.
*B62B 3/02* (2006.01)
*B62B 5/00* (2006.01)
*B62B 3/10* (2006.01)
*B62B 5/06* (2006.01)
*B62B 3/00* (2006.01)

(52) U.S. Cl.
CPC ............ *B62B 3/025* (2013.01); *B62B 3/007* (2013.01); *B62B 3/102* (2013.01); *B62B 5/0013* (2013.01); *B62B 5/06* (2013.01); *B62B 2202/52* (2013.01); *B62B 2205/06* (2013.01); *B62B 2205/12* (2013.01); *B62B 2205/24* (2013.01)

(58) Field of Classification Search
CPC .... B62B 3/007; B62B 3/02; B62B 2202/402; B62B 2202/52; B62B 2202/06; B62B 2205/12; B62B 2205/14; B62B 2205/145; B62B 2301/10; B62B 3/025; B62B 2205/02; B62B 2205/26
USPC ............. 280/638, 639, 651, 87.01, 401, 79.3; 180/208; 135/88.01, 88.02
See application file for complete search history.

(56) References Cited

U.S. PATENT DOCUMENTS

| | | | | |
|---|---|---|---|---|
| 961,234 A * | 6/1910 | Hoover | ............................ | 248/88 |
| 1,335,122 A * | 3/1920 | Mahr | .............................. | 280/42 |
| 1,432,114 A * | 10/1922 | Mahr | ............................... | 280/42 |
| 2,020,766 A * | 11/1935 | Brown | ............................ | 280/639 |
| 3,100,652 A * | 8/1963 | Schenkman | .................. | 280/644 |
| 3,625,381 A * | 12/1971 | Menzi | ............................ | 414/694 |
| 5,806,827 A * | 9/1998 | Gilmore | ........................ | 248/534 |
| 5,887,879 A * | 3/1999 | Chumley | ........................ | 280/40 |
| 5,915,723 A * | 6/1999 | Austin | ........................... | 280/651 |
| 5,979,102 A * | 11/1999 | Sagryn | ........................... | 43/21.2 |
| 6,217,043 B1 * | 4/2001 | Chumley | ........................ | 280/40 |
| 6,263,893 B1 * | 7/2001 | Spinella et al. | ............. | 135/88.01 |
| 6,409,029 B1 * | 6/2002 | Bermes | ........................ | 211/70.6 |
| 6,491,318 B1 * | 12/2002 | Galt et al. | ..................... | 280/651 |
| 6,845,991 B1 * | 1/2005 | Ritucci et al. | ................... | 280/30 |
| 7,000,928 B2 * | 2/2006 | Liao | ................................ | 280/38 |
| 7,004,481 B1 * | 2/2006 | Stanish | .......................... | 280/37 |
| 7,523,955 B2 * | 4/2009 | Blair | ............................. | 280/656 |
| 7,530,581 B1 * | 5/2009 | Squires, Sr. | ................. | 280/79.11 |
| 7,547,037 B2 * | 6/2009 | Poppinga et al. | ............. | 280/651 |
| 7,871,099 B2 * | 1/2011 | Gilbertson et al. | ........... | 280/642 |
| 7,963,530 B1 * | 6/2011 | Garcia | ............................ | 280/30 |
| 8,011,686 B2 * | 9/2011 | Chen et al. | .................... | 280/651 |
| 8,162,349 B1 * | 4/2012 | Roselle | .......................... | 280/654 |

(Continued)

*Primary Examiner* — Katy M Ebner
*Assistant Examiner* — Emma K Frick
(74) *Attorney, Agent, or Firm* — Morland C. Fischer

(57) ABSTRACT

A folding wagon having a basket within which to carry articles and/or small children and a collapsible frame to enable the wagon to be folded between an expanded open configuration at which the basket is outstretched and a compact closed configuration at which the basket is collapsed. The wagon also has pairs of front and rear wheels that are spaced outwardly from the front and rear of the wagon so as to lie ahead of and behind the basket. A handle is connected to the top of the basket at the front of the wagon. When the wagon is folded to its compact closed configuration, the pairs of front and rear wheels are positioned in axial alignment to facilitate transport and/or storage. With the wagon folded, the axially-aligned pairs of wheels and the handle form a stand for supporting the wagon in an upright position.

23 Claims, 9 Drawing Sheets

(56) References Cited

U.S. PATENT DOCUMENTS

| | | | |
|---|---|---|---|
| 8,220,824 B2* | 7/2012 | Chen et al. | 280/651 |
| 8,465,031 B2* | 6/2013 | Coghill, Jr. | 280/79.3 |
| 8,567,810 B2* | 10/2013 | Abecassis et al. | 280/651 |
| 8,746,377 B1* | 6/2014 | Dunbar | 180/19.2 |
| 8,882,135 B1* | 11/2014 | Chen | 280/651 |
| 8,973,940 B2* | 3/2015 | Chen et al. | 280/639 |
| 8,998,246 B2* | 4/2015 | Griffard | 280/651 |
| 2002/0140190 A1* | 10/2002 | Shapiro | 280/39 |
| 2003/0025301 A1* | 2/2003 | Banuelos, III | 280/651 |
| 2003/0234501 A1* | 12/2003 | Cohen | 280/47.24 |
| 2008/0129016 A1* | 6/2008 | Willis | 280/639 |
| 2009/0115167 A1* | 5/2009 | Chin et al. | 280/639 |
| 2010/0059950 A1* | 3/2010 | Coghill, Jr. | 280/47.26 |
| 2010/0090444 A1* | 4/2010 | Chen et al. | 280/651 |
| 2010/0156069 A1* | 6/2010 | Chen | 280/639 |
| 2010/0187034 A1* | 7/2010 | Wang | 180/208 |
| 2011/0204598 A1* | 8/2011 | Stevenson | 280/639 |
| 2011/0285112 A1* | 11/2011 | Chen et al. | 280/651 |
| 2012/0274052 A1* | 11/2012 | Zhu | 280/651 |
| 2014/0001735 A1* | 1/2014 | Yang et al. | 280/651 |
| 2014/0353945 A1* | 12/2014 | Young et al. | 280/650 |

* cited by examiner

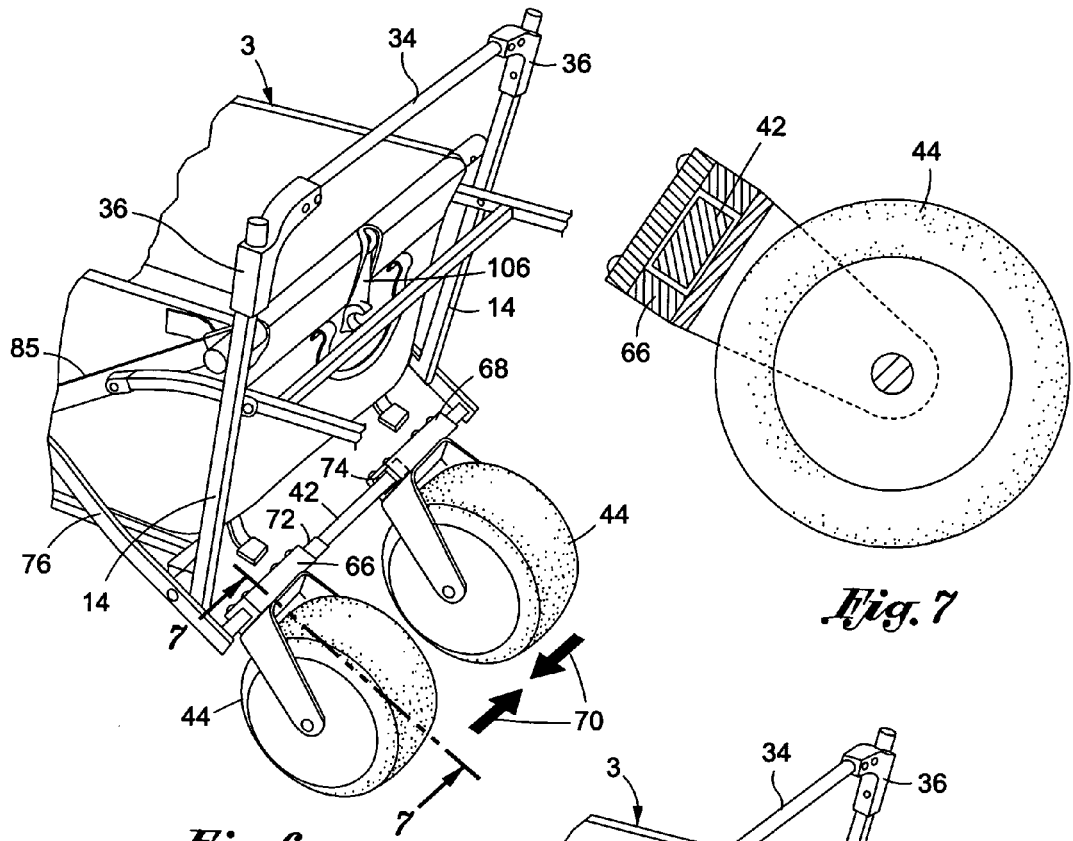
*Fig. 6*
*Fig. 7*
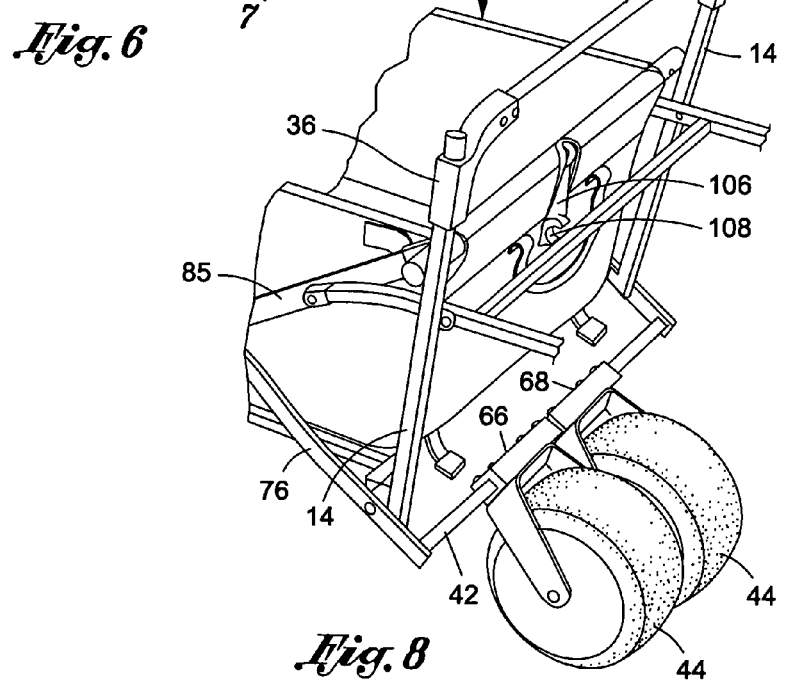
*Fig. 8*

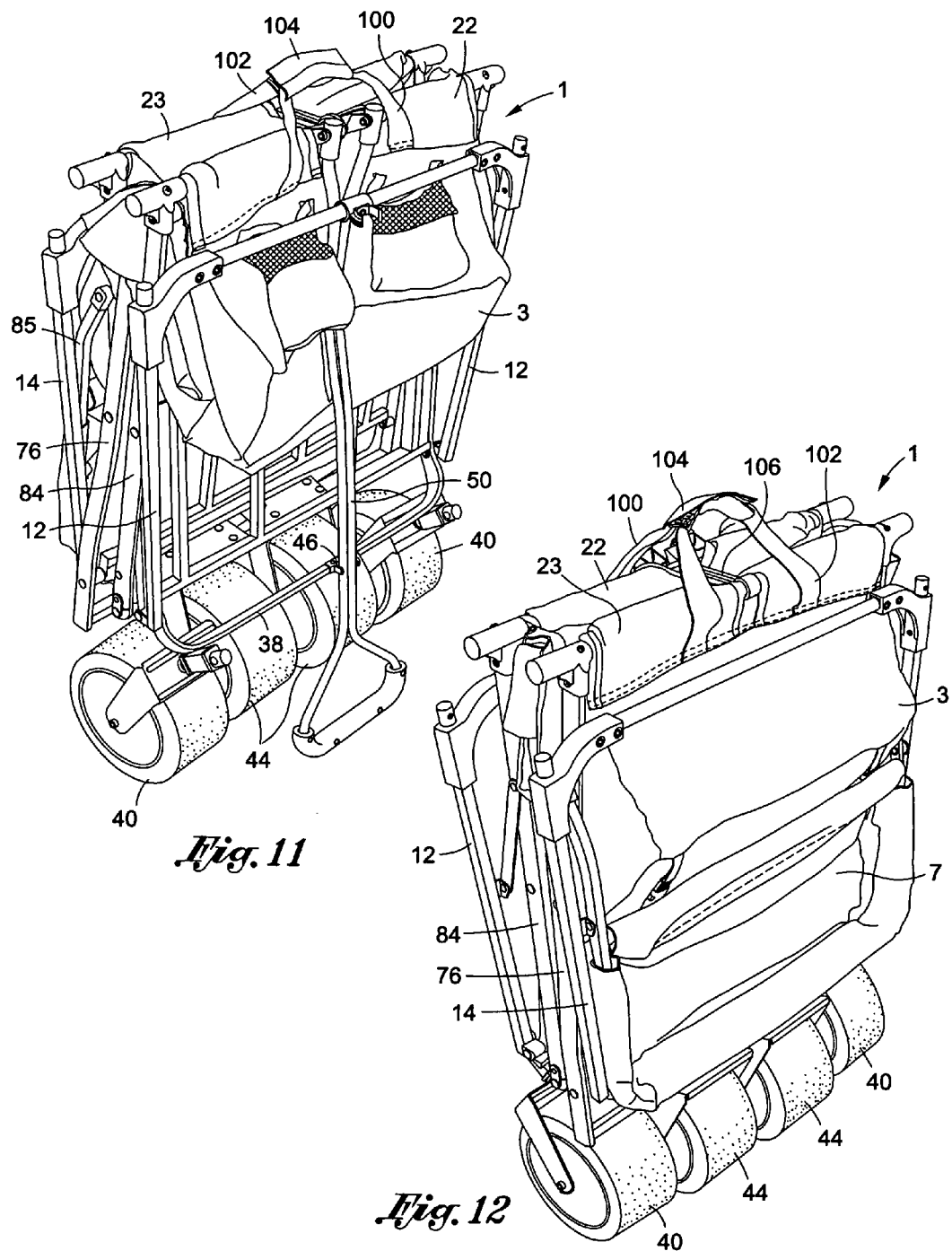

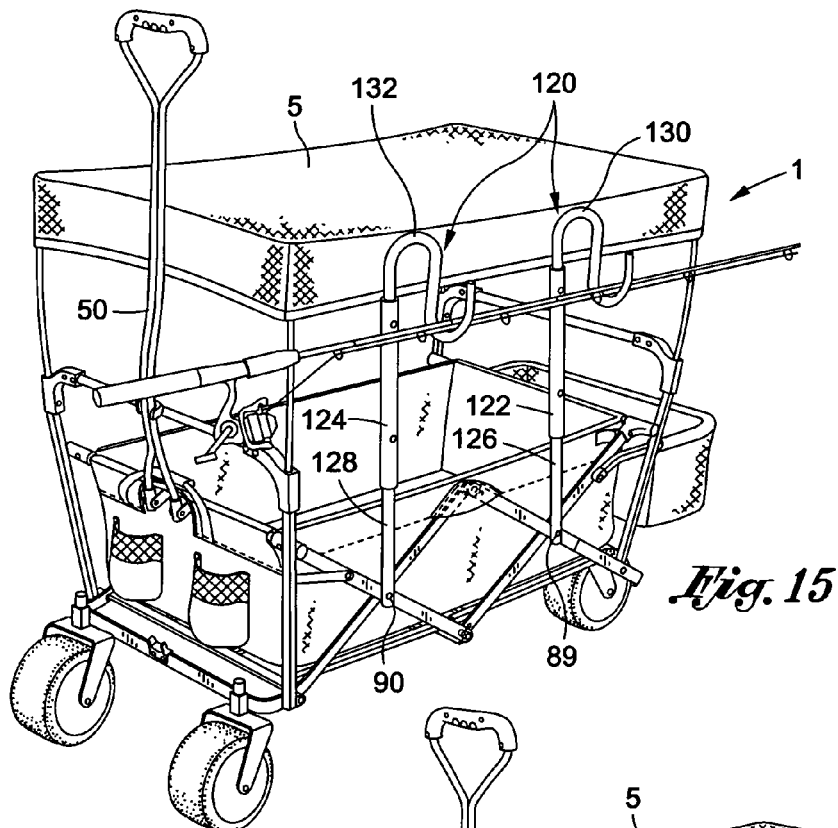
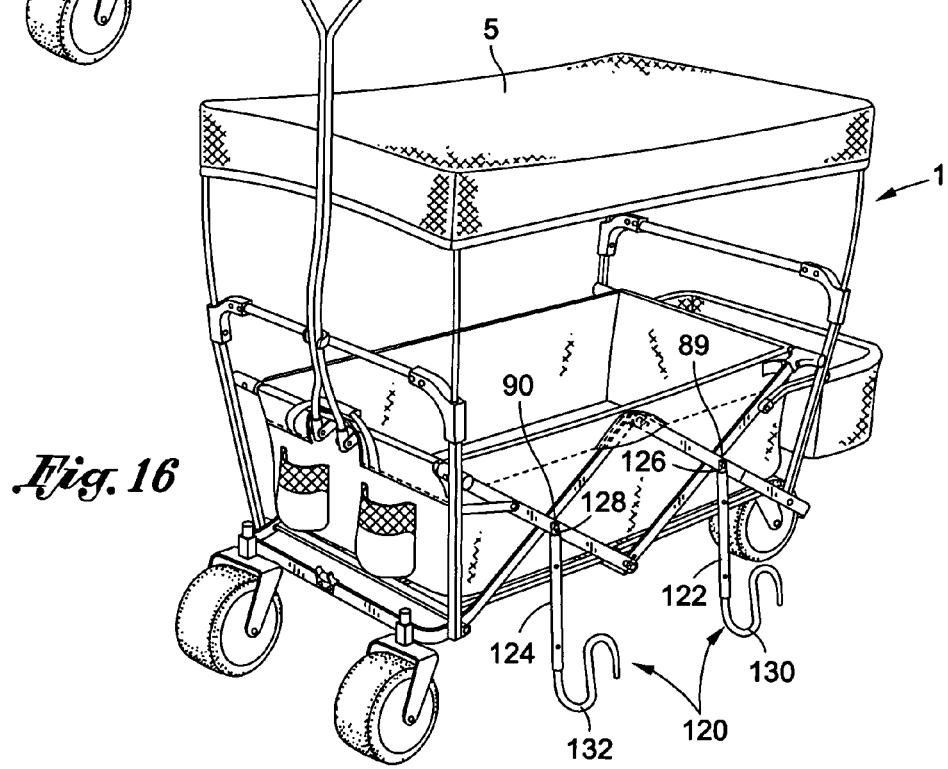

FOLDING WAGON

BACKGROUND OF THE INVENTION

1. Field of the Invention

This invention relates to a folding wagon having pairs of front and rear wheels and a fabric basket within which to carry a variety of articles or small children. The front and back wheels are positioned in axial alignment relative to another when the wagon is folded from an expanded open configuration during use to a compact closed configuration at which to facilitate transport and/or storage of the wagon when it is not being used.

2. Background Art

It is known for basket-carrying wagons to be folded and unfolded between open and collapsed configurations. However, the frame of such folding wagons tends to bind or stick when the wagon is being folded or unfolded. Such frame binding sometimes makes it difficult for the user to deploy or stow the wagon when it is not in use which often results in user frustration. Once the wagon has been unfolded to its open configuration, pairs of front and rear wheels are typically located directly below the basket. It has been found that locating the wheels below the basket can make the wagon unstable and subject to tipping over when the wagon is pulled rapidly or when the wagon travels over steep or bumpy surfaces. In this same regard, when the wagon is folded to its closed configuration, the pairs of front and rear wheels are correspondingly rotated towards and engage one another. Consequently, it is often difficult to completely fold the wagon into an ideal compact shape that is best suited for efficient transport and/or storage.

Regardless of the location of the front and rear wheels, the folding wagon is typically pulled by means of an elongated handle that has been coupled to the wagon near the bottom of the frame. Connecting the handle at this location on the frame has been known to cause the wheels to momentarily lock up and the wagon to stall when hard pushing or pulling forces are applied to the handle.

The baskets associated with conventional folding wagons are generally sized to carry a variety of articles and/or small children. However, such baskets are manufactured from a flexible material that is known to sag and collapse when the contents of the basket become relatively heavy. For some wagons, having the ability to locate an adjustable height canopy above the basket is advantageous to protect the wagon's contents from the weather. However, in some cases, it is difficult to easily and reliably connect (and disconnect) the overhead canopy to vertical canopy supports which stand upwardly from the wagon frame.

Accordingly, it would be desirable to have available an improved folding wagon that overcomes the disadvantages that are described above and remain common to conventional folding wagons.

SUMMARY OF THE INVENTION

In general terms, an improved folding wagon is disclosed which is pulled by hand and which carries a variety of articles and/or small children. The folding wagon includes a frame that is adapted to be folded from an expanded open configuration during use to a compact closed configuration at which to facilitate storage and/or transport when the wagon is not being used. A fabric basket is seated on a rack at the bottom of the frame, and a canopy is held above the basket to protect the contents of the basket from the weather. A pair of cup holders are carried at the front end of the basket, and a utility bag is carried adjacent the rear end of the basket. The canopy is mounted above the basket by means of vertically extending telescopic extensions. The telescopic extensions have canopy retention plugs at the tops thereof that are detachably connected to diagonal locking lips of respective locking panels that are sewn to inside corners of the canopy so that the canopy is reliably held in place above the basket.

The frame of the folding wagon includes front and rear basket support rods. The front and rear ends of the fabric basket are folded over and stitched together so as to surround the front and rear basket support rods. The opposite sides of the basket are folded over so as to surround side support straps. Opposite ends of the side support straps are coupled to corresponding opposite ends of the front and rear basket support rods. The basket support rods and the side support straps hold the basket up and prevent sagging when the basket carries a heavy load. One end of a handle for pulling the wagon is pivotally coupled to the front basket support rod adjacent the top of the front end of the basket. By connecting the handle to the wagon frame near the top of the basket, hard pushing or pulling forces applied to the handle are unlikely to cause the wagon wheels to lock up and the wagon to stall.

The wagon has a pair of front wheels connected to a front wheel support track that is located ahead of the basket and spaced forwardly from the rack upon which the basket is seated. The wagon also has a pair of rear wheels slidably connected to a rear wheel support track that is located behind the basket and spaced rearwardly from the basket support rack. By spacing the front and back wheels ahead of and behind the basket and the basket support rack, the folding wagon is made more stable and less likely to tip over. The pair of rear wheels is coupled to and slidable along the rear wheel support track by means of respective collars. The collars slide towards one another along the rear wheel support track, whereby the pair of rear wheels are correspondingly moved together so as to lie side-by-side one another. Accordingly, when the wagon is folded to its compact closed configuration, the pair of rear wheels will lie inside the pair of front wheels, such that the front and rear wheels will be held in axial alignment to facilitate a complete folding of the wagon so as to be ideally suited for transport and/or storage when the wagon is not in use.

The frame of the folding wagon also includes first and second pairs of side support arms that are located at each of the sides of the wagon and adapted to rotate between an outstretched position when the wagon is in use and a collapsed position when the wagon is folded and not in use. Each pair of side support arms is pivotally connected together by means of a pivot coupling. A pull strap is attached to the basket support rack below the basket. The pull strap extends from the basket support rack and upwardly through the bottom of the basket at a slit formed therein. An upward pulling force applied to the pull strap causes each of the pairs of side support arms to rotate at a respective pivot coupling to its collapsed position by which to simultaneously enable the wagon to be easily folded to its compact closed configuration without binding. After it is folded, a pulling force applied to the wagon will cause the axially-aligned pairs of front and rear wheels of the wagon to roll along a surface. In the alternative, the handle and the axially-aligned wheels can be positioned relative to one another to create a stand by which to hold the folded wagon upright when it is not in use.

BRIEF DESCRIPTION OF THE DRAWINGS

FIG. 6 is a partial perspective view of the opposite side and the rear of the folding wagon showing a pair of rear wheels spaced from one another along a rear wheel support track;

FIG. 7 is a cross-section taken along lines 7-7 of FIG. 6;

FIG. 8 is a partial perspective view of the opposite side and the rear of the folding wagon showing the pair of rear wheels moved together along the rear wheel support track;

FIG. 11 is a perspective view showing the front of the folding wagon after the wagon has been folded to the compact closed configuration at which the wheels and a handle create a stand for holding the wagon upright;

FIG. 12 is a perspective view showing the rear of the folding wagon in the compact closed configuration at which the wheels of the wagon are rolled over a surface;

FIGS. 13 and 14 show one embodiment for an optional storage rack located at one side of the folding wagon by which to carry a surfboard or the like; and FIGS. 15 and 16 show another embodiment for an optional storage rack located at a side of the folding wagon by which to carry a fishing rod or the like.

DESCRIPTION OF THE PREFERRED EMBODIMENT

Figure 1:
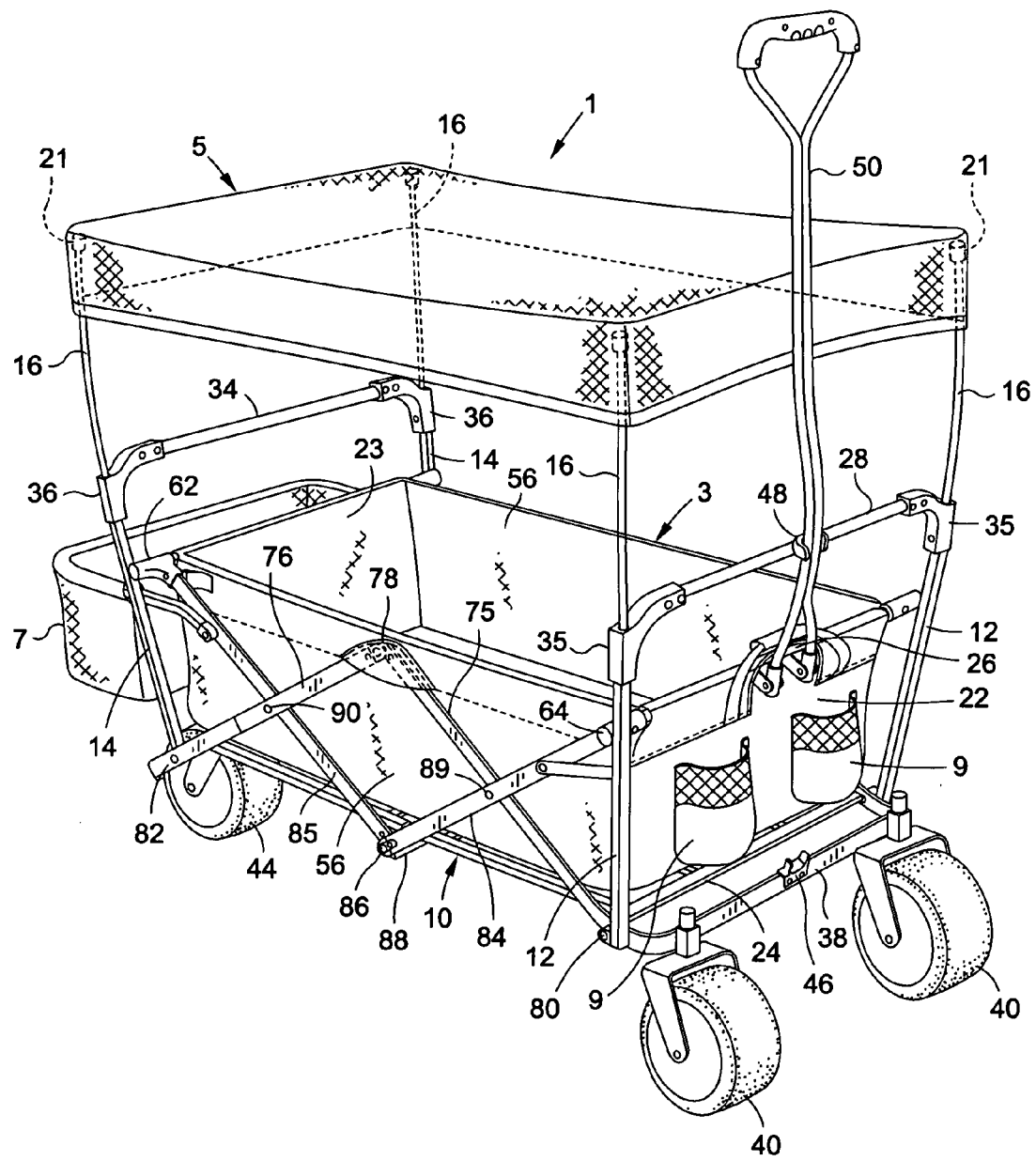
FIG. 1 is a perspective view showing a first side, the front and a canopy top of a folding wagon according to a preferred embodiment of this invention with the wagon unfolded to an expanded open configuration.
Figure 2:
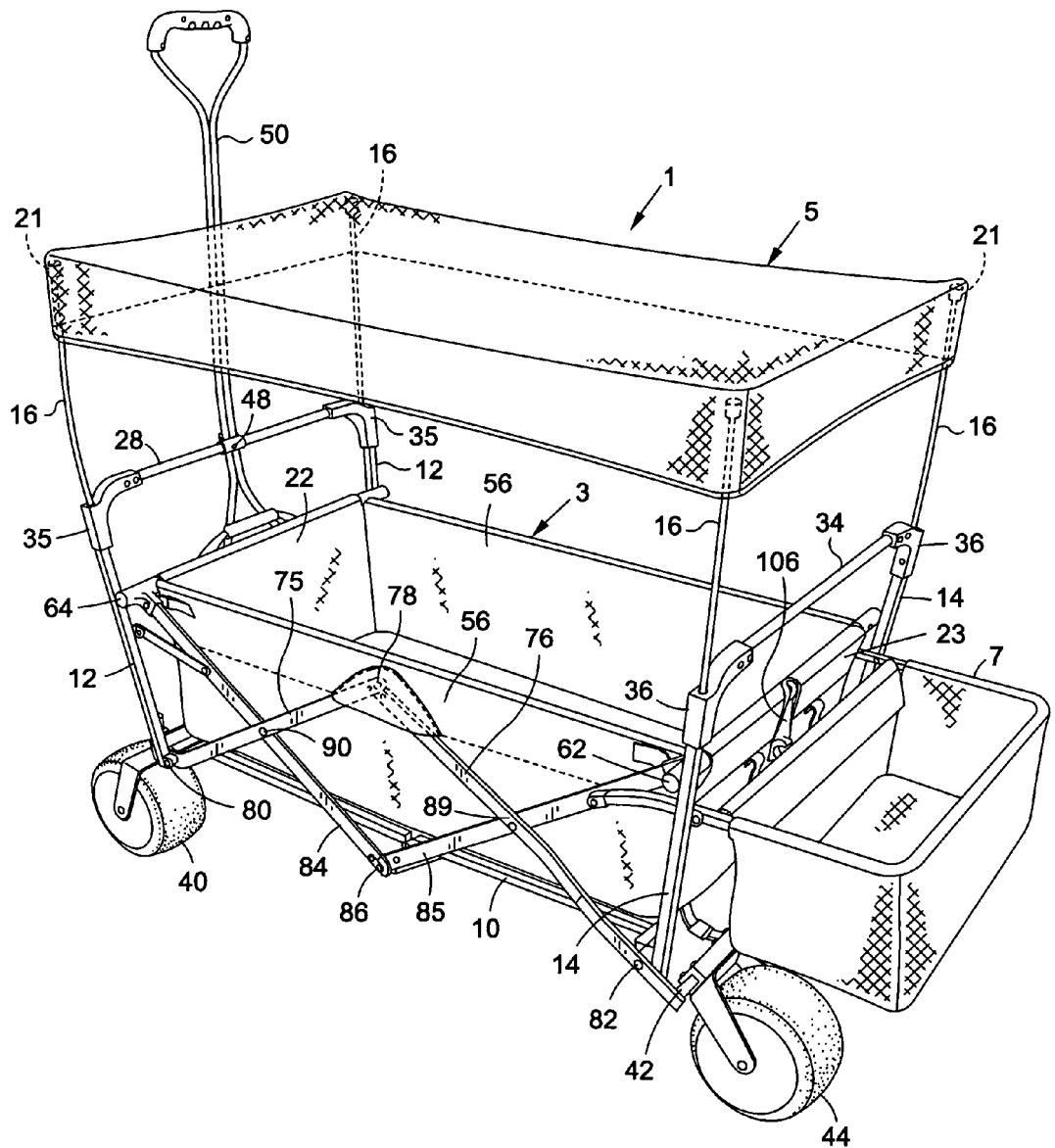
FIG. 2 is a perspective view showing the opposite side, the rear and canopy top of the folding wagon of FIG. 1.
Figure 3:
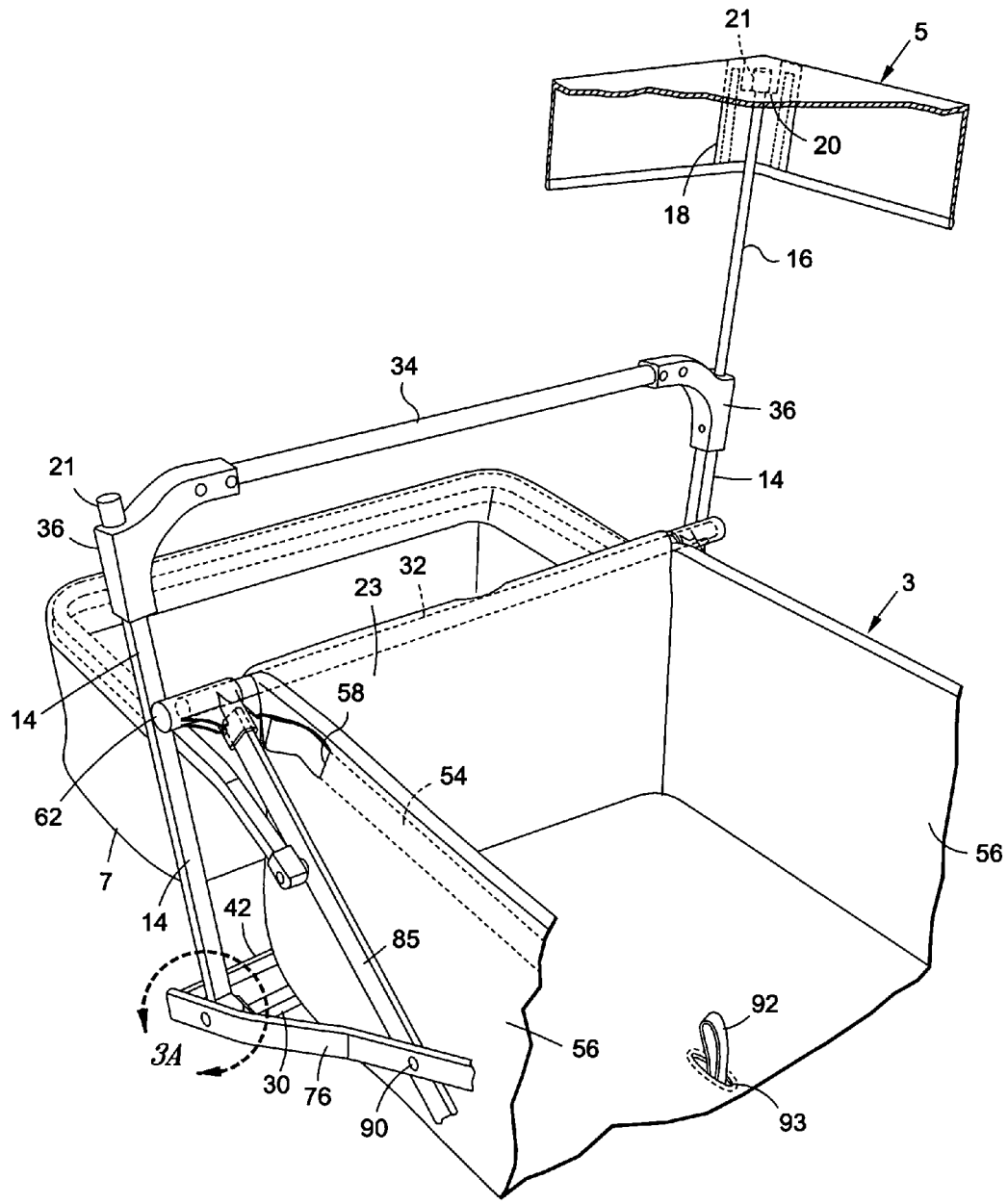
FIG. 3 is a partial perspective view of the first side and the rear of the folding wagon showing details of a telescoping extension detachably connected to one corner of the canopy top.

Referring initially to FIGS. 1-3 of the drawings, there is shown a folding wagon 1 of the kind to be pulled by hand to carry a variety of articles including, but not limited to, sporting and camping goods, business inventory, and even small children. The folding wagon 1 includes a fabric basket 3 within which to transport the articles, a fabric canopy 5 spaced overtop the basket 3 to provide shade and protection from the weather, and a fabric utility bag 7 located at the rear of the basket 3 within which small articles (e.g., keys, tools, another bag, or the like) can be conveniently carried. The fabric basket 3 is open at the top and closed along the bottom, front, back and sides. A pair of fabric cup holders 9 are attached (e.g., sewn) to the front of the basket 3 to enable beverage cups (not shown) to be received and carried therewithin.

The basket 3 lays upon and is supported by a rack 10 that runs along the bottom of the folding wagon 1. A first pair of hollow vertical support bars 12 stands upwardly from the front of the basket support rack 10, and a second pair of hollow support bars 14 stands upwardly from the rear of the basket support rack 10. A telescopic extension 16 is slidably received by each of the front and rear vertical support bars 12 and 14. The telescopic extensions 16 are detachably connected to the canopy 5 so as to be able to selectively adjust the height of the canopy 5 above the basket 3 and enable the canopy 5 to be removed from the wagon 1 in which case the telescopic extensions can be pushed downwardly inside respective ones of the vertical support bars 12 and 14.

FIG. 3 of the drawings shows one of the telescopic extensions 16 pulled outwardly and upwardly from its (e.g., rear) hollow vertical support bar 14 to be detachably connected to one corner of the canopy 5. The inside of each corner of the canopy 5 has a locking panel 16 attached (e.g., sewn) thereto. A locking lip 20 runs diagonally across a corner of the canopy 5 at the top of the locking panel 16. A canopy retention plug 21 is mounted on the top of the telescopic extension 16. With the telescopic extension 16 raised above the basket 3, the canopy retention plug 21 is seated upon the diagonal locking lip 20, whereby to prevent the canopy 5 from being lifted or blown off the extension 16 and separating from the wagon. When it is desirable to remove the canopy 5 from the wagon 1, each canopy retention plug 21 is moved off and out of engagement with the diagonal locking lip 20 of the corner locking panel 18 so that the canopy 5 is now free to be lifted off the telescopic extensions 16.

The folding wagon 1 includes a folding frame which enables the wagon to be folded from an expanded open configuration during which articles are carried within the basket 3 to a compact closed configuration at which the wagon is suitable for transport and/or storage when not in use. The frame includes a front basket support rod 26 at the front of the basket 3. A front upper frame brace 28 extends horizontally across the front of the wagon 1 between the pair of front vertical support bars 12. The frame also includes a rear basket support rod 32 at the rear of the basket 3. A rear upper frame brace 34 extends horizontally across the rear of the wagon between the pair of rear vertical support bars 14.

The front and rear basket support rods 26 and 32 are located at opposite ends of the wagon 1 and run horizontally across the top of the basket 3. The front end 22 of the basket 3 is folded over itself and closed (e.g., sewn) around the front basket support rod 26. The rear end 23 of the basket 3 is folded over itself and closed (e.g., sewn) around the rear basket support rod 32. The front and rear upper frame braces 28 and 34 are also located at opposite ends of the wagon 1 and lie between the top of the basket 3 and the canopy 5 thereover. The front and rear upper frame braces 28 and 34 are coupled to the pairs of front and rear vertical support bars 12 and 14 by means of respective pairs of elbow joints 35 and 36.

As an important advantage of the folding wagon 1, a front wheel support track 38 is spaced forward of the basket 3 by about four inches so as to lie ahead of the front end 24 of the basket support rack 10 upon which the basket 3 is seated. As will be described in greater detail hereinafter, a pair of front wheels 40 are connected to and held in place at the front wheel support track 38 by which the wheels are located in front of both the basket 3 and the basket support rack 10. Likewise, a rear wheel support track 42 (best shown in FIG. 6) is spaced rearward of the basket 3 by about four inches so as to lie behind the rear end 30 of the basket support rack 10. A pair of rear wheels 44 are connected to and movable laterally along the rear wheel support track 42 by which the wheels are held behind both the basket 3 and the basket support rack 10. By virtue of the pairs of front and rear wheels 40 and 44 being spaced outwardly from the basket 3 and the basket support rack 10, the wagon 1 is made increasingly stable and less likely to tip over when it is pulled rapidly or travels over a steep or bumpy surface.

A lower handle retention clip 46 is mounted on the front wheel support track 38 in front of the basket 3. An upper handle retention clip 48 is mounted on the front upper frame brace 28 so as to lie above the lower handle retention clip 46. A rotatable wagon handle 50 is pivotally connected to the front of the folding wagon 1 at the front basket support rod 26. Thus, it may be appreciated that rather than connecting the handle near the bottom of the basket adjacent the front wheels, as in the case of conventional wagons, the handle 50 of the wagon 1 is pivotally connected to the front basket support rod 26 around which the top of the basket 3 is folded. Thus, it has been found that rapid pulling and pushing forces can be successively applied to the wagon 1 at the wagon handle 50 without the front and wheels 40 and 44 momentarily locking up and the wagon stalling.

The wagon handle 50 has a solid shaft that is rotatable at its pivotal connection to the front basket support rod 26 between upwardly raised and downwardly lowered positions. When the folding wagon 1 is at rest in its expanded open configuration (as best shown in FIGS. 1 and 2), the handle 50 is removably attached to the upper handle retention clip 48 so as to be retained in its upwardly raised position for easy access by a user. However, when the wagon is folded to its compact closed configuration (as best shown in FIGS. 11 and 12), the handle 50 is rotated to its downwardly lowered position at which to be removably attached to and held in place by the lower handle retention clip 46 for an advantage that will be described hereinafter.

Figure 4:
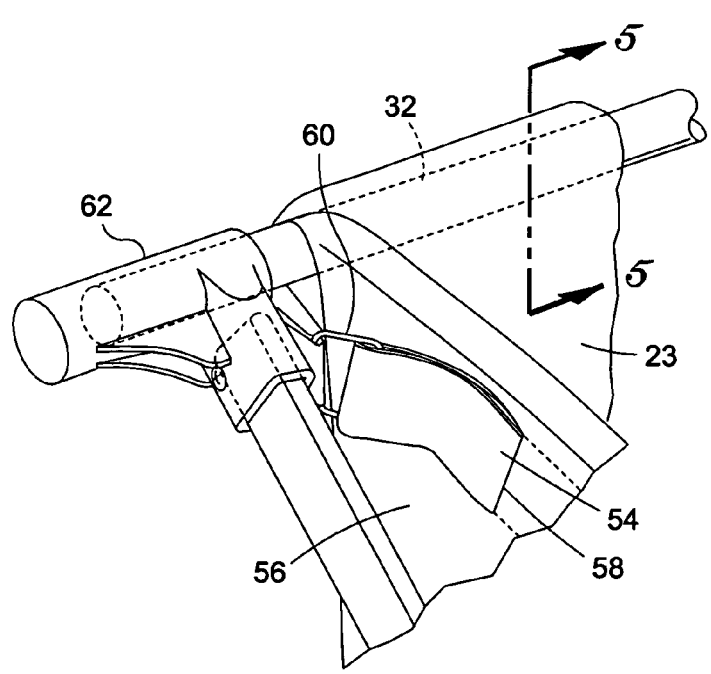
FIG. 4 is a partial perspective view of the first side and the rear of the folding wagon showing details of a support strap emerging from one side of a basket of the wagon and coupled to a rear basket support rod.
Figure 5:
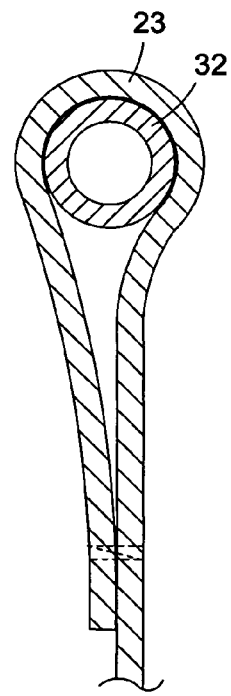
FIG. 5 is a cross-section taken along FIGS. 5-5 of FIG. 4.

Referring to FIGS. 3-5 of the drawings, a support strap 54 is shown running laterally through the top of one side 56 of the basket 3 of the folding wagon 1. Although only one side support strap 54 is shown, an identical support strap runs through each of the opposite sides 56 of the basket 3. In this regard, the top of each side 56 of the basket 3 is folded over and (e.g., sewn) closed against itself to create a loop within which to receive the support strap 54. While the front and rear basket support rods 26 and 32 hold up the front and rear ends 22 and 23 of the basket 3, each support strap 54 holds up its side 56 of the basket 3 and thereby prevents the side from sagging in response to the weight of the contents carried by the basket.

Opposite ends of the laterally-running support strap 54 emerge from the side 56 by way of slits 58 (only one of which being shown) formed in opposite ends of the side. As is best shown in FIG. 4, one end of a buckle 60 is coupled to one end of the side support strap 54. The opposite end of the buckle 60 is connected to an end cap 62 which surrounds and is affixed to one end of rear basket support rod 32. A similar buckle is coupled between the opposite end of the side support strap 54 and an end cap 64 (of FIGS. 1 and 2) which surrounds and is affixed to one end of the front basket support rod 26. Therefore, the side support strap 54 which holds up a side 56 of basket 3 is coupled at opposite ends thereof to the end caps 62 and 64 at respective ends of the front and rear basket support rods 26 and 32 at the front and rear of the wagon 1.

As was explained earlier, the folding wagon 1 has pairs of front and rear wheels 40 and 44 that are held in front of and behind the basket 3 to improve the stability of the wagon. In particular, and turning now to FIGS. 6-8 of the drawings, the pair of rear wheels 44 is shown being coupled to the rear wheel support track 42 that is spaced behind the basket 3. Each of the rear wheels 44 of the wagon 1 is coupled to one end of the rear wheel support track 42 by means of a collar 66 and 68. The collars 66 and 68 surround the rear wheel support track so as to be slidable therealong towards and away from one another. Thus, the distance between the pair of rear wheels 44 can be reduced by sliding the opposing collars 66 and 68 towards one another in the direction of the arrows 70 shown in FIG. 6. The pair of rotating front wheels 40 are stationary and do not slide towards one another, such that the distance therebetween remains constant.

After the collars 66 and 68 have been pushed towards one another along the rear wheel support track 42 so that the rear wheels 44 lie side-by-side one another as shown in FIG. 8, the rear wheels 44 will be positioned to conveniently fit between the pair of front wheels 40 which remain spaced from one another when the folding wagon 1 has been folded to its compact closed configuration (best shown in FIGS. 11 and 12). This is an important advantage by which the pairs of front and rear wheels 40 and 44 will be axially aligned to enable the folding wagon 1 to be completely folded up so as to be ideal for storage and/or transport when not in use.

One of the collars 66 has a locking sleeve 72 (best shown in FIG. 6) that extends therefrom and is slidable therewith along the rear wheel support track 42 towards the opposing collar 68. A locking receptacle 74 is formed in the opposing collar 68 within which to removably receive the sleeve 72, whereby the collars 66 and 68 will be mated to one another so that the pairs of wheels 40 and 44 are correspondingly held in axial alignment and side-by-side one another when the wagon is folded.

Figure 3A:
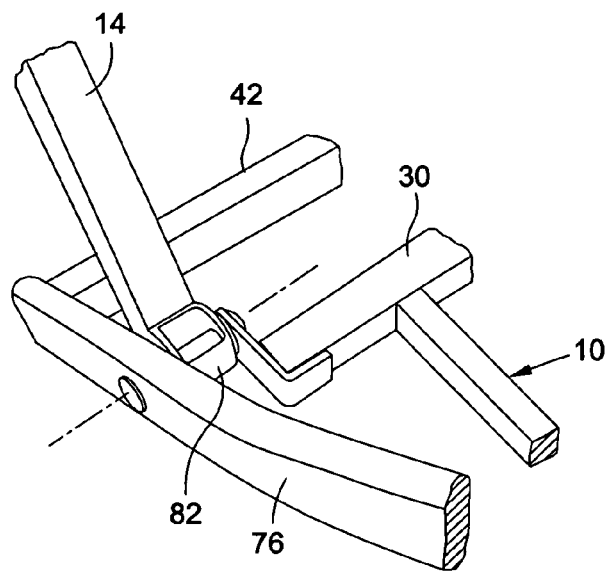
FIG. 3A shows an enlarged detail of the frame of the folding wagon taken from FIG. 3.

Returning to FIGS. 1-3A of the drawings, details of the frame of the folding wagon 1 are now described. Each side of the frame which lies outside a respective one of the sides 56 of the basket 3 includes identical first and second pairs of side support arms. A first pair of side support arms 75 and 76 are pivotally connected to one another by means of a pivot coupling 78, or the like, which extends through first ends of the support arms and the top of the adjacent side 56 of the basket 3, whereby the arms 75 and 76 are opened to make an angle of approximately 90°. The opposite end of the side support arm 75 is pivotally coupled by a pivot coupling 80, or the like, to a common joint with one of the front vertical support bars 12, one end of the front wheel support track 38, and the front end 24 of the basket support rack 10. The opposite end of the side support arm 76 is pivotally coupled by a pivot coupling 82, or the like, to a common joint (best shown in the detail of FIG. 3A) with one of the rear vertical support bars 14, one end of the rear wheel support track 42, and the rear end 30 of the basket support rack 10.

A second pair of side support arms 84 and 85 are pivotally connected to one another by means of a pivot coupling 86, or the like, which extends through first ends of the support arms for receipt by one end of a horizontal cross bar 88 (best shown in FIG. 10) that lies below and supports the basket support rack 10, whereby the arms 84 and 85 are opened to make an angle of approximately 90°. The opposite end of the side support arm 84 is connected to the end cap 64 at one end of the front basket support rod 26. The opposite end of the side support arm 85 is connected to the end cap 62 at one end of the rear basket support rod 32 (best shown in FIG. 3).

The midpoints of the side support arms 84 and 75 which cross over one another are coupled together by a pivot pin 89. The midpoints of the side support arms 76 and 85 which also cross over one another are coupled together by a pivot pin 90.

Figure 9:
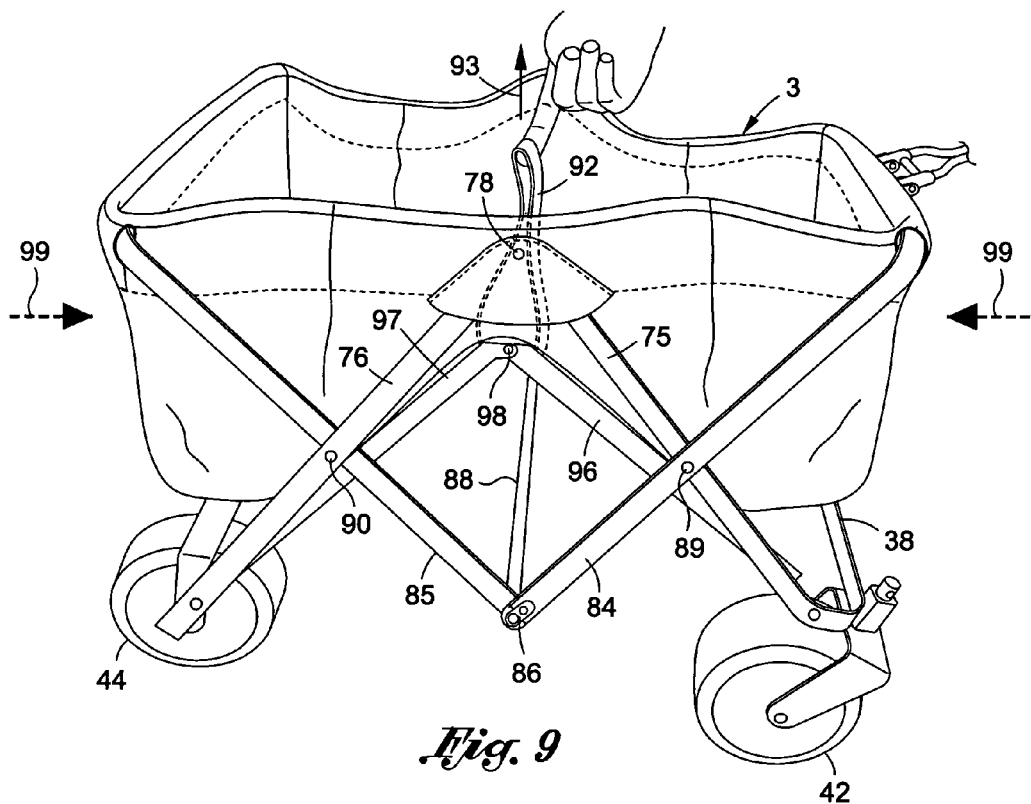
FIG. 9 is a perspective view of the folding wagon showing a lifting force being applied to a pull strap attached to the frame of the wagon below the basket thereof to cause the wagon to be folded from the expanded open configuration of FIG. 1 to a compact closed configuration.
Figure 10:
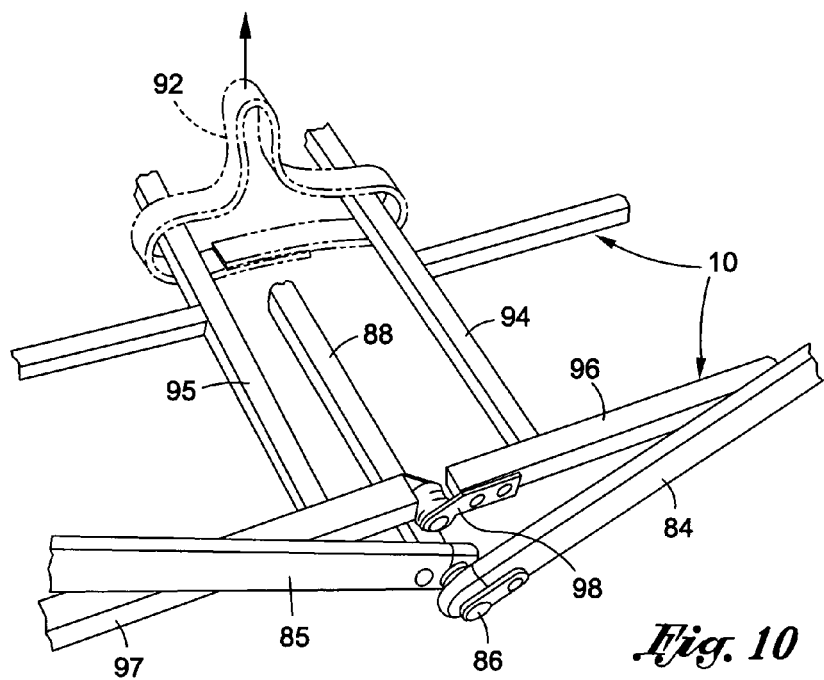
FIG. 10 is a perspective view showing details of the pull strap attached to the frame of the folding wagon to receive a pulling force for causing the wagon to be folded to the compact closed configuration.

Referring now to FIGS. 9 and 10 of the drawings, a pull strap 92 is shown looped around a pair of horizontal cross rails 94 and 95 that run in spaced parallel alignment across the basket support rack 10 which lies below and supports the basket 3. The pull strap 92 extends from the cross rails 94 and 95 upwardly through a slit 93 formed in the bottom of the basket 3 (best shown in FIG. 3) so as to be accessible to a user. The cross rails 94 and 95 are connected at opposite ends thereof to respective pairs of side rails (only one side rail 96 and 97 from each pair thereof being shown in FIG. 10) of the basket support rack 10. The basket support rack 10 includes first and second halves that are pivotally coupled together by means of intermediate pivot couplings (only one of which 98 being shown) located between axially-aligned pairs of side rails 96 and 97 at each side of the rack 10.

It may be appreciated that an upward pulling force applied by the user to the pull strap 92 in the direction of the reference arrow 93 shown in FIG. 9 will apply a corresponding upward pulling force to the first and second halves as well as to the pair of cross rails 94 and 95 of the basket support rack 3 to which the strap 92 is tied. Therefore, each of the pairs of side rails 96 and 97, between which the cross rails 94 and 95 are connected, will be lifted upwardly and off the horizontal cross bar 88. The first and second halves of the basket support rack 10 rotate at the pivot coupling 98 downwardly and towards one another from an initial horizontal position where the side rails 96 and 97 lie end-to-end to an uplifted vertical position where the side rails lie face-to-face. The uplifting and rotation of the first and second halves of the basket support rack 10 at the coupling 98 at each side of rack 10 causes the front and rear of the folding wagon 1 to be pulled towards one another in the direction of the arrows 99 of FIG. 9.

More particularly, the initially-open pairs of side support arms 75, 76 and 84, 85 at each side of the wagon 1 will rotate at their respective pivot couplings 78 and 86, whereby the side support arms 75 and 76 are lifted upwardly and moved together and the side support arms 84 and 85 are pulled downwardly and moved together. In this case, the pairs of side support arms 75, 76 and 84, 85 move relative to one another from an initial open angular position to a collapsed position at which to lie side-by-side one another. As earlier explained, the side support arms 84 and 85 are connected to the front and rear basket support rods 26 and 32 around which the front and rear ends (22 and 23 of FIGS. 1 and 2) of the basket 3 are folded, and the side support arms 75 and 76 are connected to the front and rear ends (24 and 30 of FIGS. 1-3) of the basket rack 10. Therefore, the movement of the side support arms 75, 76, 84 and 85 to the collapsed position in response to the upward pulling force applied to pull strap 92 causes the basket support rack 10 to be correspondingly lifted off the horizontal cross bar 88 so that the first and second halves of rack 10 are folded downwardly around each pivot coupling 98, whereby the side rails 96 and 97 are correspondingly rotated to their vertical position to lie face-to-face at the same time that the frame of the folding basket 1 is rotated at pivot couplings 78, 80, 82, 86, 89 and 90 (of FIGS. 1-3). Accordingly, the wagon 1 is folded from its expanded open configuration of FIGS. 1-3 to its compact closed configuration. By virtue of the aforementioned pivot couplings, the wagon is relatively easily folded without binding or sticking so as to avoid a problem that is commonly encountered by conventional folding wagons.

FIGS. 11 and 12 of the drawings show the folding wagon 1 after being folded to the compact closed configuration when the wagon is not being used. In the folded configuration, the pairs of side support arms 75, 76 and 84, 85 at each side of the wagon 1 are rotated to their collapsed position so as to be generally vertical and lie side-by-side one another. The pairs of front and rear vertical support bars 12 and 14 are pulled towards one another so that the fabric basket 3 is compressed therebetween. That is, the fabric basket 3 will be compressed from an outstretched shape when the folding wagon 1 is in its open configuration shown in FIGS. 1 and 2 to a collapsed shape when the wagon is folded to its closed configuration shown in FIGS. 11 and 12. As previously described while referring to FIGS. 6-8, the pair of rear wheels 44 are moved together so as to lie inside the pair of spaced front wheels 40, whereby all of the wheels 40 and 44 are arranged side-by-side and in axial alignment when the folding wagon 1 has been folded.

A first loop-shaped grip 100 is attached (e.g., sewn) to the front end 22 of the basket 3. A second loop-shaped grip 102 is attached to the rear end 23 of the basket. A grip tie 104 can be wrapped around the grips 100 and 102 and fastened together by means of hook and loop fastener material, whereby the grips 100 and 102 cooperate to provide a means by which to lift and/or pull the wagon in its compact closed configuration. A locking finger 106 (best shown in FIG. 12) is pivotally connected to the rear basket support rod (32 in FIG. 3) at the rear end 23 of the basket 3. The locking finger 106 is adapted to be rotated towards the front end 22 of the basket 3 so that a locking cavity thereof (designated 108 in FIG. 8) can be moved into detachable locking engagement with the front basket support rod (26 of FIG. 1), whereby the folded wagon 1 can be maintained in its compact closed configuration of FIGS. 11 and 12.

FIG. 11 shows the wagon handle 50 rotated downwardly so as to be held in removable receipt by the lower handle retention clip 46 that is mounted on the front wheel support track 38. In this case, the handle 50 and the axially-aligned front and rear wheels 40 and 44 are spaced apart and cooperate to form a stand for holding the folded wagon upright. In the alternative, the folded wagon can be pulled at the grips 100 and 102 and rolled along a surface.

Figure 13:
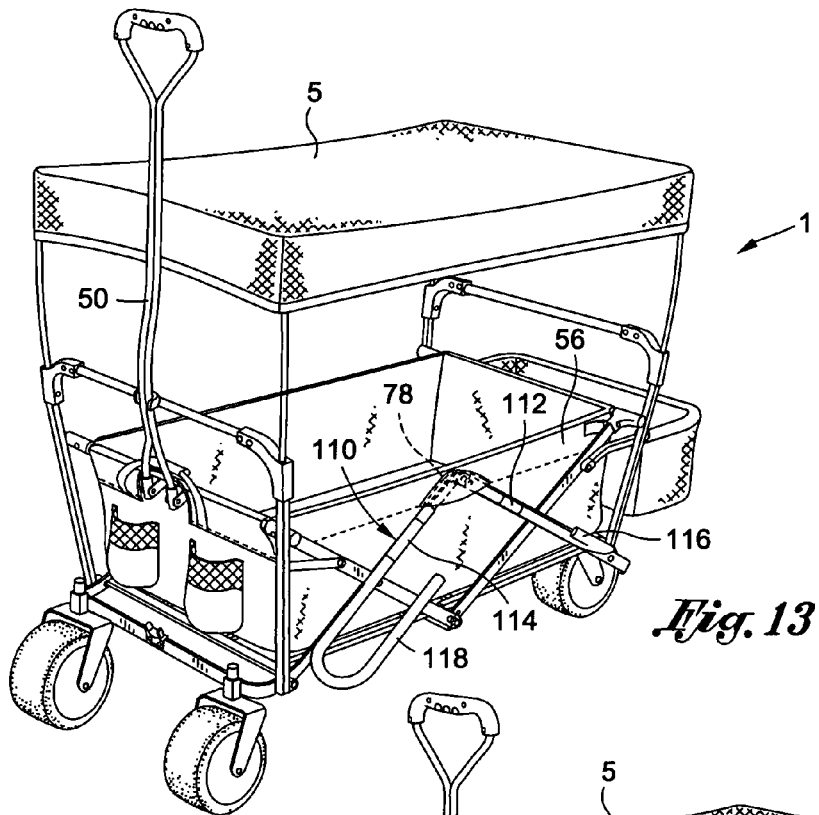
Figure 14:
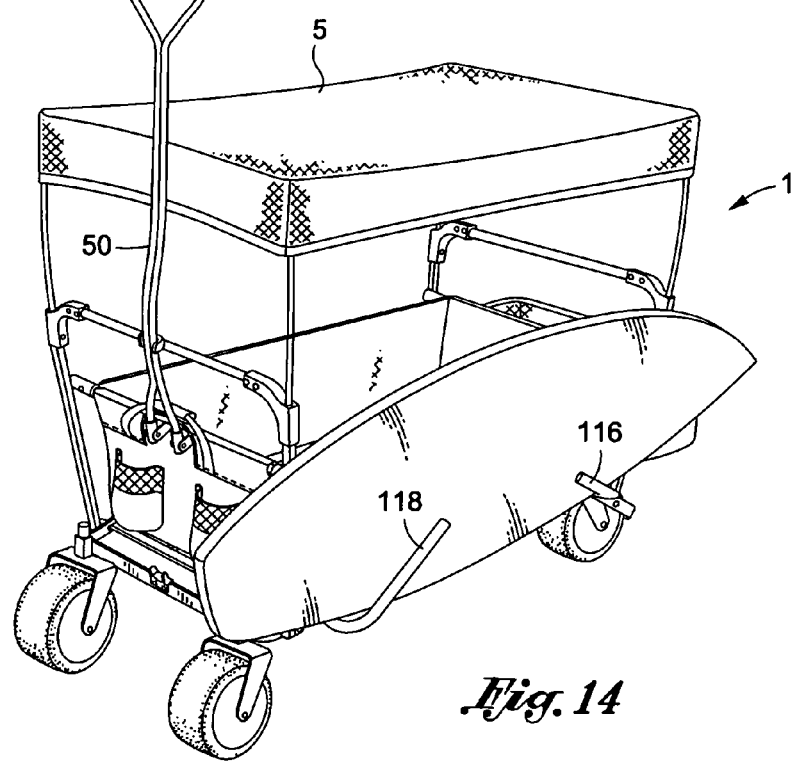

FIGS. 13 and 14 of the drawings show the folding wagon 1 of FIGS. 1 and 2 having a first optional storage rack 110 mounted at one side thereof. The storage rack 110 includes a pair of tubular legs 112 and 114. First ends of the legs 112 and 114 are attached to the wagon 1 at the same pivotal coupling 78 by which the side support arms 75 and 76 (of FIG. 9) are attached to the side 56 of the basket 3. The opposite ends of the legs 112 and 114 are bent to create hooks 116 and 118 that turn towards one another. As is best shown in the example of FIG. 14, a wide and long object, such as a surfboard or the like, can be placed within the hooks 116 and 118 so as to be conveniently carried by the storage rack 110 without reducing the storage capacity of the basket 3.

FIGS. 15 and 16 of the drawings show the folding wagon 1 of FIGS. 1 and 2 having another optional storage rack 120 mounted at one side thereof. First and second hollow tubes 122 and 124 of storage rack 120 are located between connecting rods 126 and 128 and "S"-shaped carrying hooks 130 and 132. The connecting rods 126 and 128 and the carrying hooks 130 and 132 are slidably and telescopically received and locked within opposite ends of the hollow tubes 122 and 124 to correspondingly adjust the size of the storage rack 120 depending upon the article to be carried thereby. The connecting rods 126 and 128 which project from hollow tubes 122 and 124 may be pivotally coupled to the same pivot pins 89 and 90 used to interconnect the pairs of side support arms 75, 84 and 76, 85 as was described while referring to FIGS. 1-3. Therefore, the connecting rods 126 and 128 are rotatable around pivot pins 89 and 90 from an upstanding position shown in FIG. 15 to a down-turned position shown in FIG. 16. In the example shown in FIG. 15, the carrying hooks 130 and 132 of the storage rack 120 are spaced in opposite facing, parallel alignment so as to be ideally suited for carrying long, thin objects such as a fishing rod or the like.

The invention claimed is:
1. A folding wagon having a front and a rear and comprising:
  a basket within which to carry articles;

a collapsible frame by which the folding wagon is folded between an expanded open configuration at which said basket is outstretched and a compact closed configuration at which said basket is collapsed;

a pair of front wheels connected to the front of the folding wagon, said pair of front wheels being separated from one another; and a pair of rear wheels connected to the rear of the folding wagon, said pair of rear wheels being separated from one another;

the wheels of a first of said pairs of front and rear wheels being moved towards one another while the wheels of the other one of said pairs of wheels remain separated, so that when said folding wagon is folded to said compact closed configuration, the first of said pairs of wheels is located between the other one of said pairs of wheels, whereby said pairs of front and rear wheels are axially aligned with one another; and a handle having a handle grip at one end thereof and being pivotally connected to said collapsible frame, said handle being rotated between a first position extending upwardly from said collapsible frame at which to receive a pulling force at said handle grip for pulling said folding wagon and a second position extending downwardly from said collapsible frame to the ground, said axially-aligned pairs of front and rear wheels and the handle grip of said handle being located relative to one another on the ground to form a stand said wagon in an upright position when said wagon is folded to said compact closed configuration and said handle is rotated to said second position.

2. The folding wagon recited in claim 1, further comprising an upper handle retention clip located at the front of said folding wagon to which said handle is detachably connected to hold said handle in said first position, and a lower handle retention clip located at the front of said folding wagon below said upper handle retention clip to which said handle is detachably connected to hold said handle in said second position.

3. A folding wagon having a front and a rear and comprising:

a basket within which to carry articles;

a collapsible frame by which the folding wagon is folded between an expanded open configuration at which said basket is outstretched and a compact closed configuration at which said basket is collapsed;

a pair of front wheels connected to the front of the folding wagon, said pair of front wheels being separated from one another;

a pair of rear wheels connected to the rear of the folding wagon, said pair of rear wheels being separated from one another; and a wheel support track located at one of the front or the rear of said folding wagon, the wheels of a first of said pairs of front and rear wheels being coupled to and moved together along said wheel support track while the wheels of the other one of said pairs of wheels remain separated, so that when said folding wagon is folded to said compact closed configuration, the first of said pairs of wheels is located between the other one of said pairs of wheels, whereby said pairs of front and rear wheels are axially aligned with one another.

4. The folding wagon recited in claim 3, wherein said pairs of front and rear wheels are spaced outwardly from respective ones of the front and rear of said folding wagon so as to lie ahead of and behind said basket.

5. The folding wagon recited in claim 3, further comprising first and second collars surrounding and sliding along said wheel support track, the wheels of the first of said pairs of front and rear wheels connected to respective ones of said first and second collars so as to move therewith towards and away from one another.

6. The folding wagon recited in claim 5, wherein one of said first and second collars has a locking sleeve extending therefrom and the other one of said collars has a locking receptacle, said locking sleeve being received within said locking receptacle when said first and second collars slide along said wheel support track towards one another, whereby the wheels of the first of said pairs of front and rear wheels are correspondingly moved side-by-side one another.

7. The folding wagon recited in claim 3, further comprising a first pair of hollow support bars located at the front of said folding wagon, a second pair of hollow support bars located at the rear of said folding wagon, telescopic extensions slidably received by respective ones of said first and second pairs of hollow support bars, a canopy retention plug located at the top of each telescopic extension, a canopy spaced above said basket, and means to detachably connect the canopy retention plug of each telescopic extension to said canopy.

8. The folding wagon recited in claim 7, wherein the canopy spaced above said basket has four corners, said means to detachably connect the canopy retention plug of each telescopic extension to said canopy including a locking lip extending diagonally across each one of the four corners of said canopy, each telescopic extension sliding in a first direction through a respective hollow support bar of the first and second pairs of hollow support bars towards said canopy so that the canopy retention plug at the top of said telescopic extension is seated upon said locking lip to prevent said telescopic extension from sliding in an opposite direction.

9. The folding wagon recited in claim 7, wherein said basket has a top, a bottom, a front end located at the front of said folding wagon, a rear end located at the rear of said folding wagon, and a pair of sides running between said front and rear ends, said folding wagon further comprising a front basket support rod extending between the first pair of hollow support bars at the front of said folding wagon and being attached to the front end of said basket at the top thereof, and a rear basket support rod extending between the second pair of hollow support bars at the rear of said wagon and being attached to the rear end of said basket at the top thereof.

10. The folding wagon recited in claim 9, further comprising a handle pivotally connected to the front of said folding wagon at said front basket support rod, said handle being rotatable between a first position extending vertically upwardly from the top of said basket and a second position extending vertically downward from the top of said basket.

11. The folding wagon recited in claim 10, further comprising an upper handle retention clip located at the front of said folding wagon above the top of said basket to which said handle is detachably connected to hold said handle in said first position, and a lower handle retention clip located at the front of said folding wagon below the top of said basket to which said handle is detachably connected to hold said handle in said second position.

12. The folding wagon recited in claim 11, wherein said axially-aligned pairs of front and rear wheels and said handle are located relative to one another to form a stand for supporting said wagon in an upright position when said wagon is folded to said compact closed configuration and said handle is rotated to said second position and detachably connected to said lower handle retention clip.

13. The folding wagon recited in claim 9, further comprising a locking finger coupled to the rear basket support rod that is attached to the rear end of basket, said locking finger being detachably connected between said rear basket support rod and the front basket support rod that is attached to the front end of said basket when said folding wagon is folded to the compact closed configuration, whereby to retain said folding wagon in said compact closed configuration.

14. The folding wagon recited in claim 9, further comprising a first side support strap extending between one hollow support bar of said first pair of hollow support bars and one hollow support bar of said second pair of hollow support bars, one of the pair of sides of said basket attached to said first side support strap, and a second side support strap extending between the other hollow support bar of said first pair of hollow support bars and the other hollow support bar of said second pair of hollow support bars, the other one of the pair of sides of said basket attached to said second side support strap.

15. The folding wagon recited in claim 9, further comprising at least one cup holder attached to one of the front end or the rear end of said basket.

16. The folding wagon recited in claim 3, wherein said collapsible frame includes a basket support rack lying below and supporting said basket, said basket support rack having first and second halves that are pivotally coupled to one another and rotatable between a horizontal position at which said first and second halves lie end-to-end when said wagon is in the expanded open configuration and said basket is outstretched and a vertical position at which said first and second halves lie face-to-face when said wagon is in the compact closed configuration and said basket is collapsed.

17. The folding wagon recited in claim 16, further comprising a pull strap attached to said basket support rack, said pull strap receiving a pulling force to cause the first and second halves of said basket support rack to rotate from said horizontal position to said vertical position.

18. The folding wagon recited in claim 17, wherein said basket has an open top and a closed bottom seated upon said basket support rack, said pull strap extending from said basket support rack through the closed bottom of said basket by way of a slit formed in said closed bottom.

19. A folding wagon having a front and a rear and comprising:
 a basket within which to carry articles;
 a collapsible frame by which the folding wagon is folded between an expanded open configuration at which said basket is outstretched and a compact closed configuration at which said basket is collapsed;
 a pair of front wheels connected to the front of the folding wagon, said pair of front wheels being separated from one another; and
 a pair of rear wheels connected to the rear of the folding wagon, said pair of rear wheels being separated from one another,
 the wheels of a first of said pairs of front and rear wheels being movable towards and away from one another, such that the wheels of the first of said pairs of wheels are moved towards one another while the wheels of the other one of said pairs of wheels remain separated, so that when said folding wagon is folded to said compact closed configuration, the first of said pairs of wheels is located between the other one of said pairs of wheels, whereby said pairs of front and rear wheels are axially aligned with one another and wherein when the wagon is folded to said compact closed configuration, an axis of rotation of said pair of front wheels is parallel to an axis of rotation of said pair of rear wheels.

20. The folding wagon recited in claim 19, wherein said pairs of front and rear wheels are spaced outwardly from respective ones of the front and rear of said folding wagon so as to lie ahead of and behind said basket.

21. The folding wagon recited in claim 19, further comprising a wheel support track located at one of the front or the rear of said folding wagon, the wheels of the first of said pairs of front and rear wheels being coupled to and movable along said wheel support track such that said wheels move towards and away from one another.

22. The folding wagon recited in claim 21, further comprising first and second collars surrounding and sliding along said wheel support track, the wheels of the first of said pairs of front and rear wheels connected to respective ones of said first and second collars so as to move therewith towards and away from one another.

23. The folding wagon recited in claim 22, wherein one of said first and second collars has a locking sleeve extending therefrom and the other one of said collars has a locking receptacle, said locking sleeve being received within said locking receptacle when said first and second collars slide along said wheel support track towards one another, whereby the wheels of the first of said pairs of front and rear wheels are correspondingly moved side-by-side one another.

\* \* \* \* \*